United States Patent [19]
Domurat

[11] Patent Number: 5,301,463
[45] Date of Patent: Apr. 12, 1994

[54] MUTLIPLE ORIENTATION FLORAL STAND

[76] Inventor: Kevin X. Domurat, 4135 Dixie Canyon Ave., Sherman Oaks, Calif. 91423

[21] Appl. No.: 11,806

[22] Filed: Feb. 1, 1993

[51] Int. Cl.$^5$ .............................................. A01G 5/00
[52] U.S. Cl. .................................. 47/41.01; 47/41.15
[58] Field of Search ................ 47/41.01, 41.11, 41.12, 47/41.15

[56] References Cited

U.S. PATENT DOCUMENTS

| | | | |
|---|---|---|---|
| 253,389 | 5/1882 | Drew | 47/41.01 |
| 1,577,873 | 3/1926 | Moot | 47/41.01 |
| 1,885,879 | 11/1932 | Whittington | 47/41.01 |
| 2,486,848 | 11/1949 | Huck | 47/41.01 |
| 2,887,824 | 5/1959 | Rila | 47/41.01 |
| 3,157,558 | 11/1964 | Adler | 47/41.01 |
| 3,158,524 | 11/1964 | Tong | 47/41.11 |
| 3,169,897 | 2/1965 | Yue | 47/41.11 |

FOREIGN PATENT DOCUMENTS

| | | | |
|---|---|---|---|
| 32420 | 9/1939 | Australia | 47/41.15 |
| 157466 | 2/1904 | Fed. Rep. of Germany | 47/41.11 |

Primary Examiner—Henry S. Raduazo
Attorney, Agent, or Firm—Monty Koslover Associates

[57] ABSTRACT

A floral stand which is designed to display flower or branch arrangements in any desired orientation, including horizontally or upside down. The stand is a hollow shell made of a light weight plastic material and formed into any pleasing shape desired for flower display. Inside the shell are located air-tight compartments for holding liquid nutrient. Each compartment includes a hole for insertion of a flower stem into it and a means to grip the stem tightly. The air-tight nature of the compartments, the stem gripping means and the relative difference in pressure between the inside of the water filled compartment and the outside air, prevent the possibility of any significant fluid leakage from the stand in any orientation and under normal handling conditions.

3 Claims, 2 Drawing Sheets

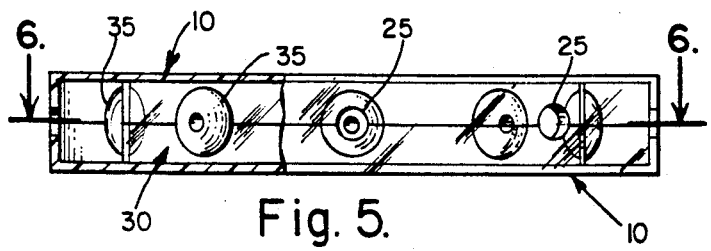
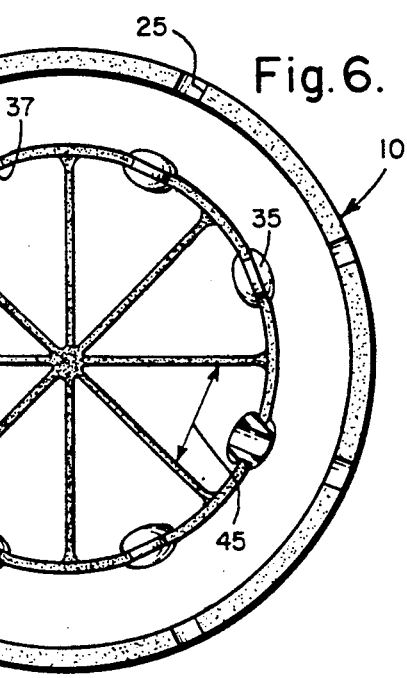
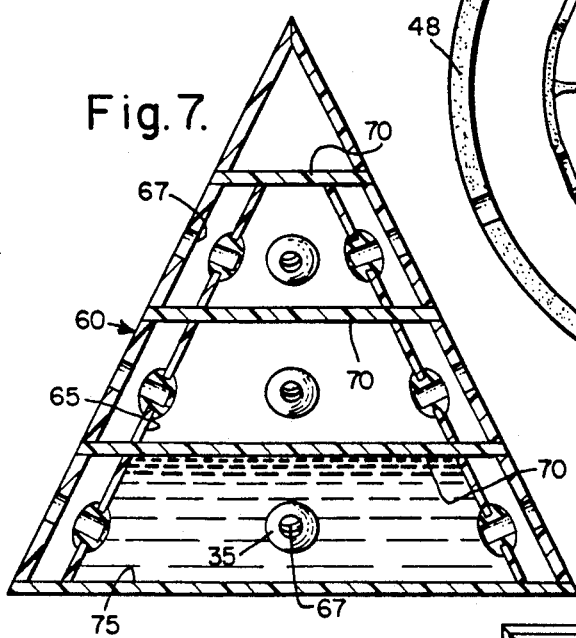
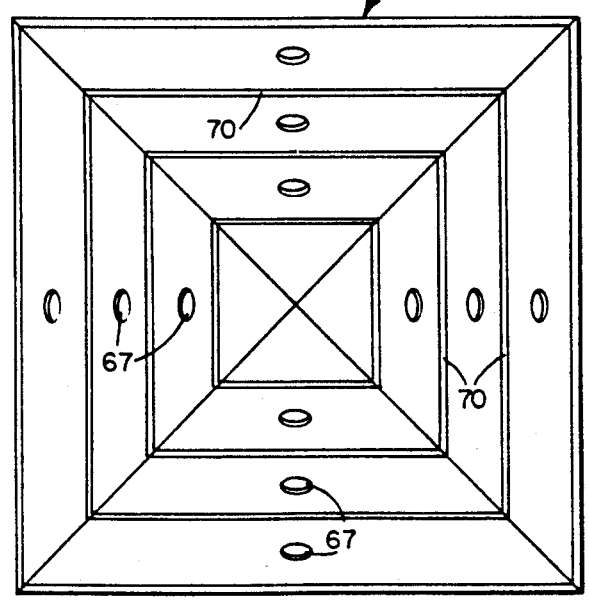

MULTIPLE ORIENTATION FLORAL STAND

BACKGROUND AND SUMMARY OF THE INVENTION

This invention relates to flower holding stands for flower and branch arrangements. In particular, the invention is a floral stand that can be mounted in any desired orientation and location.

This invention is an improvement to an earlier invention, U.S. patent application Ser. No. 07/743,218 "FLORAL STAND", by Kevin X. Domurat. In the earlier invention embodiment, a multiple orientation flower stand is configured, allowing the stand to be fastened to walls, windows or even ceilings, with flower arrangements projecting downwards and sideways as well more conventionally upwards. The earlier invention flower stand utilizes an outer shell and an inner core to hold the flowers. Watering of the flowers is obtained by two layers of porous material that retain the nutrient fluid and sandwich the flower and branch stems. Angular spring clips are incorporated to hold the stems in place, particularly when the flowers are upside down.

The invention improvement is a change in the stand internal configuration which does away with the need for layers of porous material and spring clips. In the improvement, nutrient fluid is retained within air-tight pockets inside the stand by static and vacuum pressure, and will not leak out in any stand orientation. Specially designed grommets hold the stems tightly and also act as an additional water seal. Accordingly, it is a principal object of the present invention to provide an improved floral stand which permits flower and/or branch arrangements to be displayed in any desired location, whether vertically, with flowers upside down or conventionally.

Another object of the present invention is to provide a flower holder which will not require additional filling with nutrient fluid or water after its initial filling.

Advantages of the present invention over the prior invention floral stand include its relative simplicity of construction and its ability to hold a greater amount of liquid nutrient for a given flower stand size, thus being able to hold sufficient fluid for the lifetime of the display.

Further objects and advantages of the present invention will become apparent from a study of the following portion of the specification, the claims and the attached drawings.

BRIEF DESCRIPTION OF THE DRAWINGS

FIG. 5 is a partially cutaway side elevation view of the preferred embodiment of the present invention, particularly showing the division of the stand in identical halves, and the grommets located in place on the inner ring;

FIG. 6 is a view of half of the preferred embodiment of the present invention, taken along line 6—6 of FIG. 5;

FIGS. 7 and 8 are respectively, a side elevation view and top view of a first alternate embodiment of the present invention, particularly showing how a pyramid shaped flower stand may be constructed;

DESCRIPTION OF THE PREFERRED AND ALTERNATE EMBODIMENTS

Figure 1:
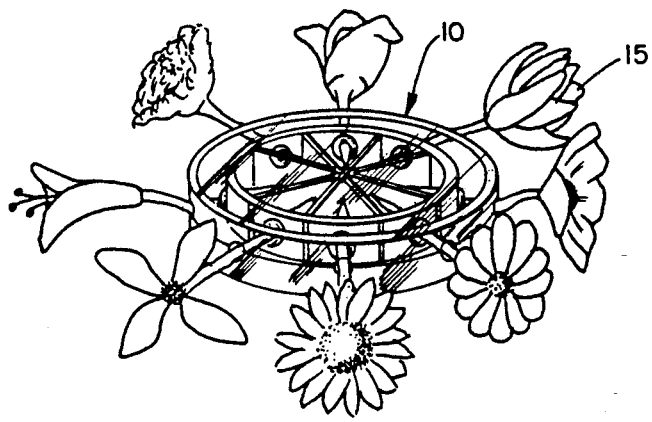
FIG. 1 is a perspective view of the preferred embodiment of the present invention flower stand, particularly showing how flowers and branches may be displayed.

Referring particularly to the drawings, there is shown in FIGS. 1, 2, 5 and 6 a preferred embodiment of the present invention multiple orientation floral stand. In the drawings, the floral stand is depicted as transparent in order to better reveal the inner construction. However, the stand material is polystyrene plastic sheet, transparent or opaque.

FIG. 1 is a perspective view of the preferred embodiment flower stand having a circular disk shaped hollow shell 10, with flower 15 stems inserted in the shell 10 through holes in its circumferential edge. As can be seen in FIG. 1, each flower stem is inserted into a separate compartment which serves as a liquid reservoir. These compartments have been filled with liquid nutrient prior to insertion of the flower stems.

The flower stand comprises a plastic hollow shell 10 completely enclosing an internal volume, and an internal portion 30 watering means comprising a plastic outer wall enclosing a multiple number of liquid reservoirs 45 formed by dividers 40. The internal portion 30 walls and dividers are formed molded to the outer shell 10, making them air-tight and leaving a substantial space between the inner surface 20 of the shell 10 and the wall surrounding the internal portion 30 watering means. Located spaced around the external surface of the shell are holes 25 sized for the insertion of flower or branch stems. In the case of the circular disk configuration shown in FIGS. 1 and 2, the stem holes 25 are located around the circumferential side surface perpendicular to the flat, circular top and bottom shell surfaces. The stem holes 25 are located, each radially in line with the center of a liquid reservoir 45 in the internal portion.

On the outer wall of each reservoir 45 is formed or cut a hole 37 which is sized to accommodate a special grommet 35. Each grommet hole 37 is located in line with the stem hole 25 in the outer shell corresponding to a given liquid reservoir 45. The reservoir 45 outer wall immediately around the grommet hole 37 is flattened to ensure proper seating of the grommet 35 and sealing. This aspect is shown in the detail drawing of FIG. 6a.

Since the preferred embodiment configuration is disk shaped, the entire disk shell 10 is split horizontally on its thickness into two identical halves indicated by plane 6—6 in FIG. 5. This enables placing the grommets 35 in each grommet hole 37 before assembling the flower holder.

Figure 3:
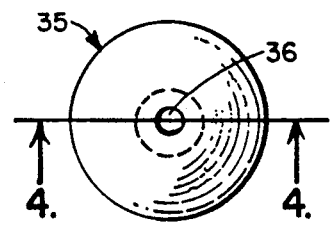
FIG. 3 is a top view of a special grommet used in the present invention to retain flower and branch stems.
Figure 4:
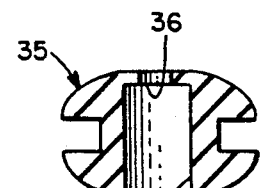
FIG. 4 is a cutaway side elevation view of the special grommet taken along line 4—4 of FIG. 3.

A special grommet 35 is illustrated in FIGS. 3 and 4. As shown, it is circular 'button' shaped as a conventional grommet and is plastic. However, its central axis bore 38 terminates at one surface, termed the upper or outer surface, with a thin wall or membrane. The center of this upper surface membrane is pierced with a small hole or perforation 36, shown in exaggerated size for clarity in FIGS. 3 and 4. The perforation in the grommet membrane allows the grommet membrane to stretch, permitting insertion of a flower stem or branch and gripping the stem tightly once it is inserted in the reservoir 45.

The two halves of the shell are assembled and adhered together using a suitable plastic glue 48 on all the open edges of the shell and inner portion walls. Thus, the assembled floral stand will have a completely air tight internal portion containing reservoirs except for the perforation holes in the grommets. The assembled floral stand is then prepared for use by filling the liquid reservoirs 45 with nutrient fluid, and adding adhesive or a hanger to one outside surface or edge of the floral stand for use in hanging the floral stand.

Filling the reservoirs with fluid can best be done by using a dropper which can be inserted in the outside stem holes and pushed through the perforation in the grommet sealing each reservoir. The fluid is forced into the reservoir by pressure applied by the dropper bulb. At the same time, most of the air in the reservoir is displaced by the fluid, being partly absorbed by the fluid and partly expelled around the grommet to the outside.

In a possible variation of the design, a central hole in the floral stand that communicates with each of the reservoirs may be incorporated. The central hole could then be used for filling all the reservoirs at the same time. An air-tight cap would cover the hole entry when the unit was not being filled. This represents an alternate approach to filling the reservoirs through the grommets.

Testing has been performed to demonstrate that the reservoirs will not leak fluid out through the grommets in any orientation, including vertical. This is because fluid leaving the airtight reservoir, even under gravitational force, encounters a strong fluid skin tension at the grommet perforation and a greater outside pressure. This is quite sufficient to overcome gravitational force. The demonstrations have been performed both with and without flower stems inserted in the grommets.

It has also been demonstrated that even sharp movements or sudden accelerations such as dropping on the floor will not cause any substantial leakage, although some slight leakage may occur around the stem of any flower which is upside down during a sudden acceleration. In normal handling, however no leakage will occur.

Figure 2:
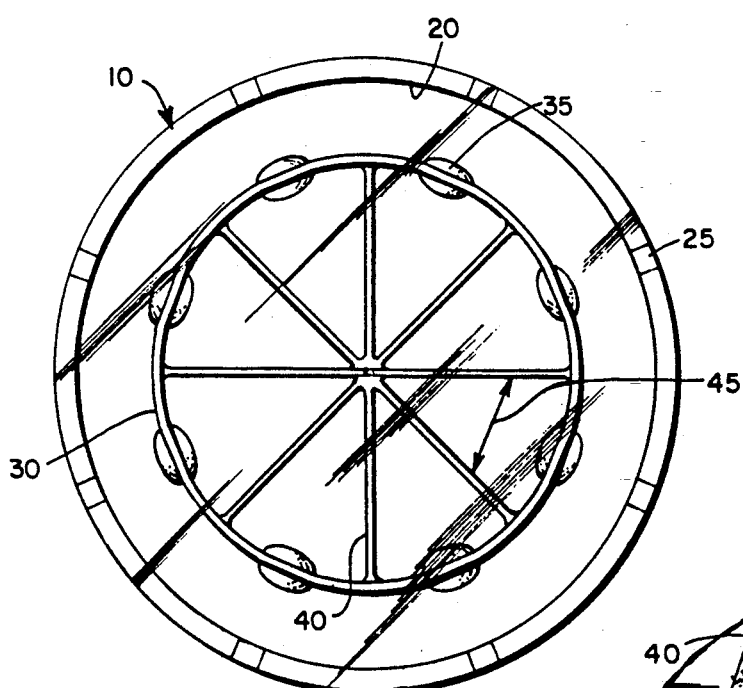
FIG. 2 is a plan view of the preferred embodiment of the present invention, particularly showing through a transparent top, the watering means compartments.
Figure 6A:
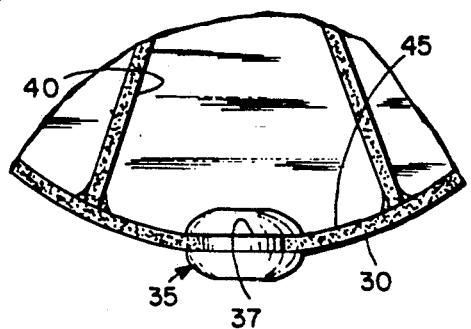
FIG. 6a is a partial view of the inner ring portion of the preferred embodiment, useful in showing detail of the attachment of the grommets to the inner portion.

In addition to the floral stand configuration illustrated in FIGS. 1 and 2, other configurations having the same embodiment may be desired. For example, instead of the full circle disk shown in FIG. 2, a semi-circular disk may be used. The reservoirs 45, grommets 35 and stem holes 25 would be located as in the full circle disk configuration. A semi-circular disk floral stand could be hung and placed in any orientation in the same manner as for the full circle disk.

Another alternate configuration for the invention floral stand is illustrated in FIGS. 7 and 8. A cross-section side elevation view is shown in FIG. 7 and a top or plan view is shown in FIG. 8. In this configuration, the plastic shell 60 forms a pyramid that can be placed vertically on its base 75 or have its base attached to a vertical surface such as a wall, or even hung upside down. Inside the shell 60 is an inner portion formed by a wall 65 which parallels all four vertical faces of the pyramid and completely encloses an inner volume. This inner volume is divided vertically into separate air-tight compartments by horizontal sheets 70. In FIGS. 7 and 8, a best method of achieving the inner portion configuration is shown as using separate partial frustrum sections of the pyramid, one placed and glued on top of the other. Each section, except for the top pyramid, would be open at the top. Thus the compartment divider function would be performed by the bottom sheet 70 or base of each section.

The compartments become liquid reservoirs for the flowers and branches. A bottom compartment is illustrated as being full of liquid in FIG. 7. As for the previous configurations, holes 67 for the flower stems are bored or formed in the outer vertical faces of the pyramid. Grommet holes and grommets 35 are located on the inner portion walls 65 in line with each flower stem hole 67. In this configuration, it is obvious that the bottom compartment at the base of the pyramid has a greater volume than those compartment above it. This need not be so. The relative compartment volumes may be adjusted to be more nearly equal by adjusting the height of each compartment accordingly. Or if this is not desired, more flowers (and flower stem holes) can be added to the lower sections. The configuration variations are thus considerable and are not restricted in any way to that depicted in FIGS. 7 and 8. As an example, the bottom section of the pyramid alone, with a suitable glued on air-tight cover, could be another useful floral stand configuration.

Various modifications may be made in the construction of the floral stand described above. These changes, which are in accordance with the spirit of this invention, come within the scope of the appended claims and are embraced thereby.

Having described the invention, what is claimed is:

1. A multiple orientation floral stand comprising:
   (a) a hollow shell, having inner and outer surfaces and shaped in any pleasing configuration for flower and branch display; said shell having cut in its outer surface a multiplicity of first holes, said first holes being sized to accommodate flower or branch stems; and
   (b) a watering means inside said hollow shell, said watering means including a liquid reservoir portion; said liquid reservoir portion comprising an outer continuous wall surrounding said reservoir, and a multiplicity of divider walls, creating separate liquid reservoir compartments;
   said liquid reservoir outer wall and divider walls being attached to said inner surface of said hollow shell to make said liquid reservoir compartments air-tight;
   said liquid reservoir compartments each having a second hole cut in its outer wall and lined up with one of said first holes in said shell, said second hole being sized to accommodate a flower or branch stem which may be inserted through said first hole and through said second hole into said liquid reservoir compartment;
   said liquid reservoir compartments each including a means for gripping tightly said flower or branch stem; said means being inserted in and attached to said second hole; said means for gripping also acting to prevent leakage of liquid from said liquid reservoir compartments when said shell is oriented in a direction to induce liquid flow;
   said liquid reservoir portion providing a means to grip said flower or branch stems and to water them continuously, independent of the orientation of said shell and flower arrangement, whether horizontal or vertical.

2. The floral stand of claim 1, wherein
said liquid reservoir compartment means for tightly gripping said flower or branch stems includes a specially sized and configured plastic grommet; said grommet hole in the membrane across one end and a perforation hole in the center of said membrane; said grommet also incorporating a bore on its center axis, communicating with said perforation hole in said membrane; said membrane acting to stretch and tightly grip a flower or branch stem that is pushed through said perforation hole and said bore.

3. The floral stand as described in claim 1, wherein said hollow shell and the walls of said liquid reservoir compartments are made from plastic material for light weight.

* * * * *